R. B. ROBINSON.
RETAINING DEVICE FOR DEMOUNTABLE RIMS.
APPLICATION FILED JULY 26, 1913.
1,106,890.
Patented Aug. 11, 1914.
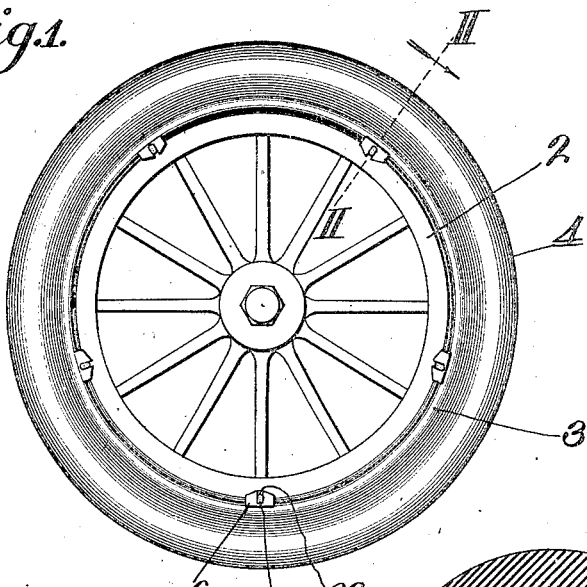
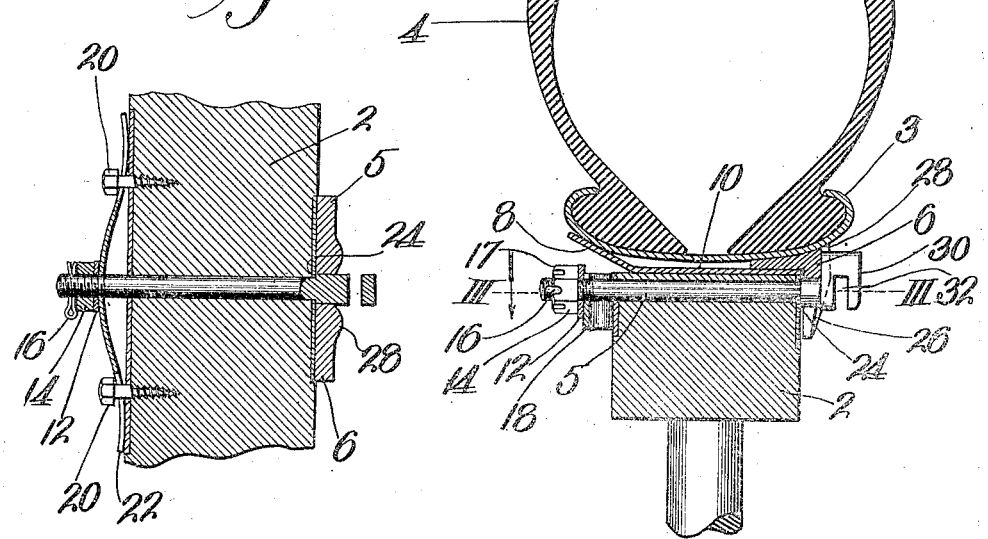
Witnesses
Frank R. Glon
Chas W. Gerard
Inventor
R. B. Robinson
By George F. Thorpe Atty.

UNITED STATES PATENT OFFICE.

ROBERT B. ROBINSON, OF KANSAS CITY, MISSOURI.

RETAINING DEVICE FOR DEMOUNTABLE RIMS.

1,106,890.

Specification of Letters Patent. Patented Aug. 11, 1914.

Application filed July 26, 1913. Serial No. 781,305.

*To all whom it may concern:*

Be it known that I, ROBERT B. ROBINSON, a citizen of the United States, residing at Kansas City, in the county of Jackson and State of Missouri, have invented certain new and useful Improvements in Retaining Devices for Demountable Rims, of which the following is a specification.

This invention relates to improvements in retaining devices for the demountable rims of wheels using pneumatic tires, and it is my object to produce a simple device of this character which will enable a rim to be quickly removed and replaced and reliably secured in position upon the wheel.

Specifically, the invention contemplates a wedging device of which the bolt member and most of the parts are retained permanently by the felly of the wheel so that there is no danger of any of them becoming lost or misplaced in the process of changing the tires.

With this and other objects in view as will appear in the course of the description, my invention resides in certain novel and peculiar features of construction as hereinafter particularly pointed out and claimed; and to afford a clear understanding of the same, reference will be had to the accompanying drawing, forming a part of this specification, and in which—

Figure 1 is a side elevation of a wheel with the rim secured thereto by my improved fastening means; Fig. 2 is a vertical section along the line II—II of Fig. 1; and Fig. 3 is a circumferential section through the line III—III of Fig. 2 and looking in the direction of the arrow.

Referring to the drawing, the felly 2 of the wheel to which the rim 3 carrying the tire 4 is to be applied, is provided with a series of fastening devices each of which comprises a bolt member 5 mounted slidingly in the felly near the outer face thereof, and a removable wedging member 6 which is adapted to coöperate with an annular flange projection 8 formed upon an annular strip of metal 10 with which the felly is faced, for retaining the rim 3 in place. At one end, each of the bolts is provided with a washer 12 and nut 14, the latter being locked by a cotter 16 engaging recesses 17 in the face of the nut. Between each washer 16 and the adjacent face of the felly is interposed a bowed spring 18, which is secured to the felly by means of screws 20 fitted in open-ended slots 22 in the ends of the spring, so that the spring may be flattened inward when necessary. The opposite end of each bolt is shouldered at 24 to fit against the adjacent face of the felly, and each retaining member 6 is provided with a depending portion which is downwardly beveled, as shown, and recessed at 26 to form a yoke to engage said shoulder. On the outer face of this depending portion is also formed a pair of bosses 28 between which is retained the head 30 of the bolt when the latter is turned in position to retain the wedging member 6 in place, the head being sprung in between said bosses by the action of the spring 18.

The manipulation of the device will now be clearly understood. Assuming that the tire and rim are in place as shown in Fig. 2, and it is desired to demount the same, the bolt 5 is turned to dispose the head 30 in register with the recess 26, whereupon the wedging member 6 is released and may be withdrawn from engagement with the rim 3. This operation is carried out with each of the fastening devices, and the rim and tire then removed. The only parts of the device which are removed from the wheel are the members 6, all of the other parts remaining in position on the wheel and no danger of their loss incurred. When the rim is to be replaced, the members 6 are restored to position beneath the rim and astraddle the bolts 5, and the latter turned, in which operation the heads 30 ride up the beveled faces of the members 6; if the springs do not readily allow the turning of the bolts, a suitable tool (not shown) may be used to engage the recesses 32 in the heads 30 to pry the same outward sufficiently to afford the bolts the required turning movement. As soon as the heads have passed over one of the bosses 28, the springs reseat them in final locked position.

From the foregoing it will be apparent that I have provided a very simple and efficient device for carrying out the objects of my invention; and while I have shown and described what I deem the preferred form of the same, I desire to reserve the right to any changes and modifications falling within the scope of the appended claims.

I claim—

1. In a device for securing demountable rims to wheels, a wedge member adapted to engage the rim and provided with a radially extending portion having a pair of spaced bosses and with a bolt engaging recess, and a spring-actuated bolt permanently mounted on the wheel and adapted to be received in said recess, said bolt having a head adapted to removably engage said radially extending portion for moving the wedge member into clamping engagement with the rim, said bosses acting to retain said head engaged with the said radially extending portion.

2. In a device for securing demountable rims to wheels, a wedge member adapted to engage the rim and provided with a beveled radially extending portion having a pair of spaced bosses and a marginal bolt-engaging recess, and a spring-actuated bolt mounted on the wheel and provided with a head adapted, when the stem of the bolt is received in said recess, to be engaged by said beveled portion and partially withdraw the bolt against the action of its spring when the head is rotated, the continued rotation of the head causing it to be seated between said bosses with the wedge member held clamped against the rim.

In testimony whereof I affix my signature in the presence of two witnesses.

ROBERT B. ROBINSON.

Witnesses:
CHAS. W. GERARD,
G. Y. THORPE.